United States Patent [19]
Bauver, II

[11] Patent Number: 5,819,539
[45] Date of Patent: Oct. 13, 1998

[54] DETECTING AND PURGING COMBUSTIBLE GASES FROM HEAT RECOVERY STEAM GENERATOR CAVITIES

[75] Inventor: Wesley Paul Bauver, II, Granville, Mass.

[73] Assignee: Combustion Engineering, Inc., Windsor, Conn.

[21] Appl. No.: 773,945

[22] Filed: Dec. 30, 1996

[51] Int. Cl.$^6$ ................................................. F01K 13/02
[52] U.S. Cl. ................................................................ 60/646
[58] Field of Search ......................................... 60/646, 657

*Primary Examiner*—Noah P. Kamen
*Attorney, Agent, or Firm*—Alix, Yale & Ristas, LLP

[57] ABSTRACT

A gas turbine combined cycle system with a heat recovery steam generator which may include enclosed adjacent cavities may accumulate combustible gas mixtures during shutdowns. Gas detectors located in the heat transfer section of the heat recovery steam generator, in related duct work and in the adjacent cavities detect the presence of these gas mixtures and produce appropriate signals. A signal from the detectors in the cavities initiate the aspiration of the mixture from the cavity. Signals from the detectors in the heat transfer section and ducts as well as from the cavities control the gas turbine so that upon start-up, no fuel is introduced to the gas turbine so that the gas turbine forces purge air through the heat recovery steam generator. When all of the signals indicate that no combustible gas mixtures are present, the gas turbine is ignited.

3 Claims, 2 Drawing Sheets

DETECTING AND PURGING COMBUSTIBLE GASES FROM HEAT RECOVERY STEAM GENERATOR CAVITIES

The present invention relates to gas turbine combined cycle systems with heat recovery steam generators and particularly to an improved method and system for purging combustible gases during shutdown periods.

BACKGROUND OF THE INVENTION

Gas turbines fueled by combustible gas have been widely used to provide power for electric utilities usually for standby or peaking power. Because the thermal efficiency of the gas turbine by itself is rather low due to the high exit gas temperature, the gas turbine is often combined with a heat recovery steam generator and a steam turbine to produce additional electricity. As a combination of a gas turbine cycle and a steam turbine cycle, these systems are referred to as "combined cycles". Gas turbines with heat recovery steam generators are also used to produce process steam in co-generation cycles.

Such plants often operate under cycling conditions or are shut down at times of low demand. Since there is a risk of combustible gas leaking into the heat recovery steam generator and accumulating during the shutdown periods, standard procedures for operating such units include a purge cycle to remove any potential gas buildup. This is particularly important during restart of the gas turbine to assure that no combustible and potentially explosive mixture exists in the system before ignition of the gas turbine. Purge is usually accomplished by rotating the gas turbine using the starting motor with air flow but without supplying fuel. This results in air flow through the gas turbine and the heat recovery steam generator system. Air flow provided by the gas turbine under non-combustion conditions is limited by the size of the starting motor. If additional purge air is required, a supplemental fan is provided for additional flow.

Some heat recovery steam generators include an enclosed section or cavity located adjacent to the main section containing the heat transfer surface, usually above or to the side. This enclosed cavity usually contains headers and links between headers. Although these cavities are generally enclosed, there is not a tight seal between the main heat transfer section and the cavity. If a gas leak or other conditions exist which cause a buildup of combustible gas, it is possible for the gas to leak into these adjacent cavities. Since the gas is usually lighter than air, it is particularly susceptible to leakage into an overhead cavity. Even though the rate of leakage is low, the concentration level of the gas in the cavity could build up to combustible or explosive levels over a period of time. A standard purge of the heat recovery steam generator main section will not remove this gas from the cavity since there is very little actual flow from the main section into the cavity. Heat recovery steam generators of other types, such as vertical gas flow units, may contain tube sheets or other components which provide regions which are also not easily purged by standard purging techniques.

Another problem is that existing systems for the purge of the heat recovery steam generator have a set purge flow for a set period of time. Although these set purge conditions are based on available data for expected worst case conditions, they are arbitrary and do not guarantee the safe removal of the combustible gases before gas turbine ignition. Also, these set conditions require a purge cycle when there are no combustible gases present and the purge is unnecessary.

SUMMARY OF THE INVENTION

The buildup of combustible and potentially explosive gas mixtures in heat recovery steam generator systems is detected and such gas mixtures are purged. In isolated cavities of the system such as overhead and side cavities, the presence of the combustible gas mixture is detected by a combustible gas detector, and the cavity is purged of combustible gases by a vent line and aspirator installed to induce flow out from the cavity. The detector can be used to activate the aspirator and the venting of the gas mixture. In order to insure that combustible gas levels within the boiler itself and the associated ductwork are at safe levels before gas turbine ignition, another aspect of the invention provides gas detectors in these regions which are linked to the gas turbine control system and control purge cycles. A necessary condition for the control system to permit gas turbine ignition is that there are safe levels of combustible gas at the detector locations.

DESCRIPTION OF THE PREFERRED EMBODIMENT

Figure 1:
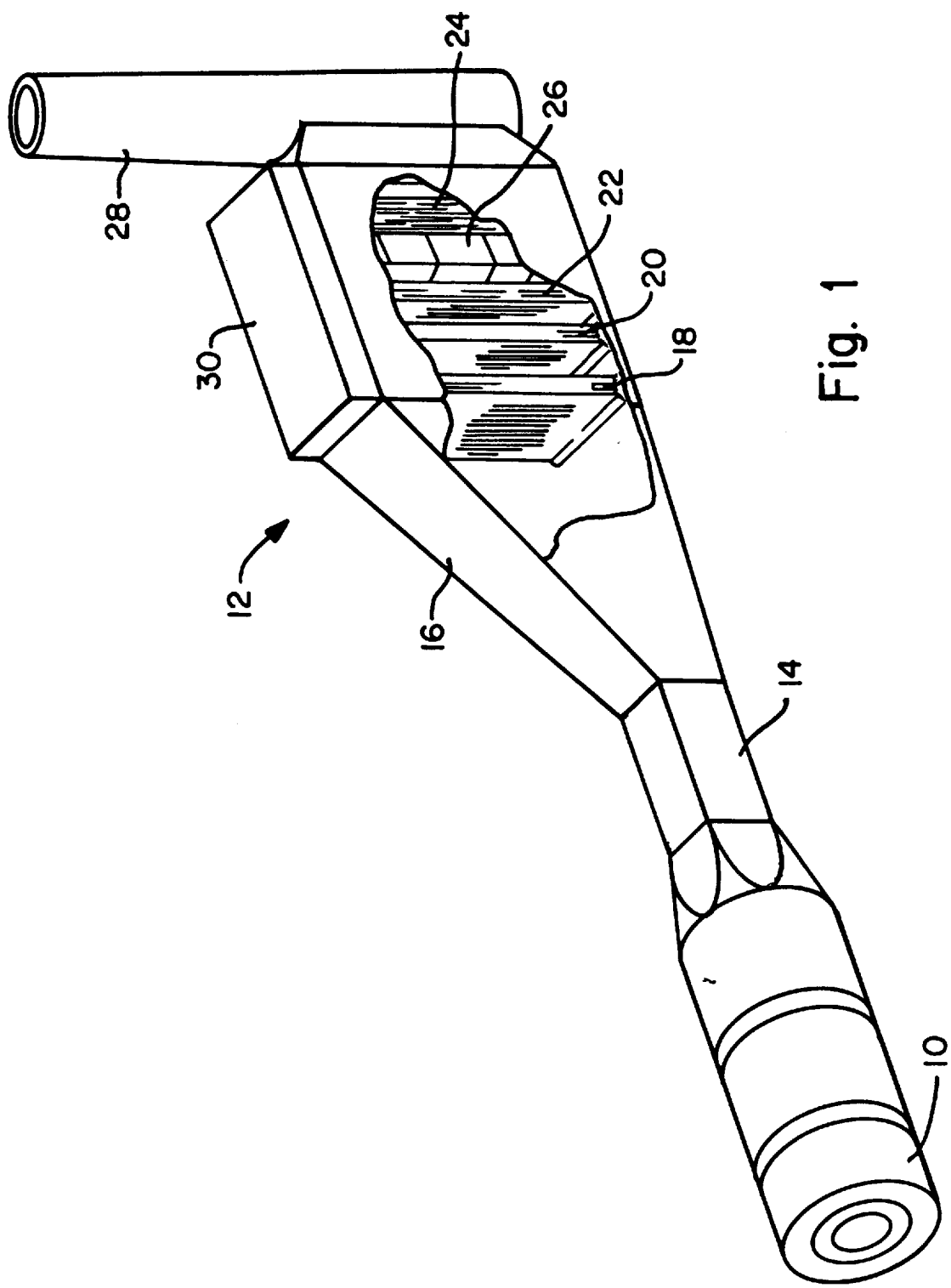
FIG. 1 is a perspective view of a typical arrangement of a gas turbine and horizontal-gas-flow heat recovery steam generator system.

FIG. 1 is a perspective view of a typical gas turbine 10 with the exhaust discharging into heat recovery steam generator generally designated 12. With the exit gas temperature from the gas turbine being in the range of 425° to 540° C. (about 800° to 1000° F.), there is considerable heat to be recovered in the steam generator to generate steam which drives an electric generator via a steam turbine or is used as process steam.

The heat recovery steam generator 12, which is of the horizontal type for purposes of illustration, comprises an expanding inlet transition duct 16 where the gas flow is expanded from the duct 14 to the full cross-section of the portion of the steam generator containing the heat transfer surface. The heat transfer surface comprises the various tube banks 18, 20, 22 and 24, which, by way of example only, may be various combinations of superheater surface, evaporative surface, economizer surface and feedwater preheating surface. Any desired combination of such heat exchange surface is compatible with the present invention. The unit may also contain a selective catalytic section 26 for the reduction of $NO_x$. The fuel gases from the steam generator are discharged through the stack 28.

Figure 2:
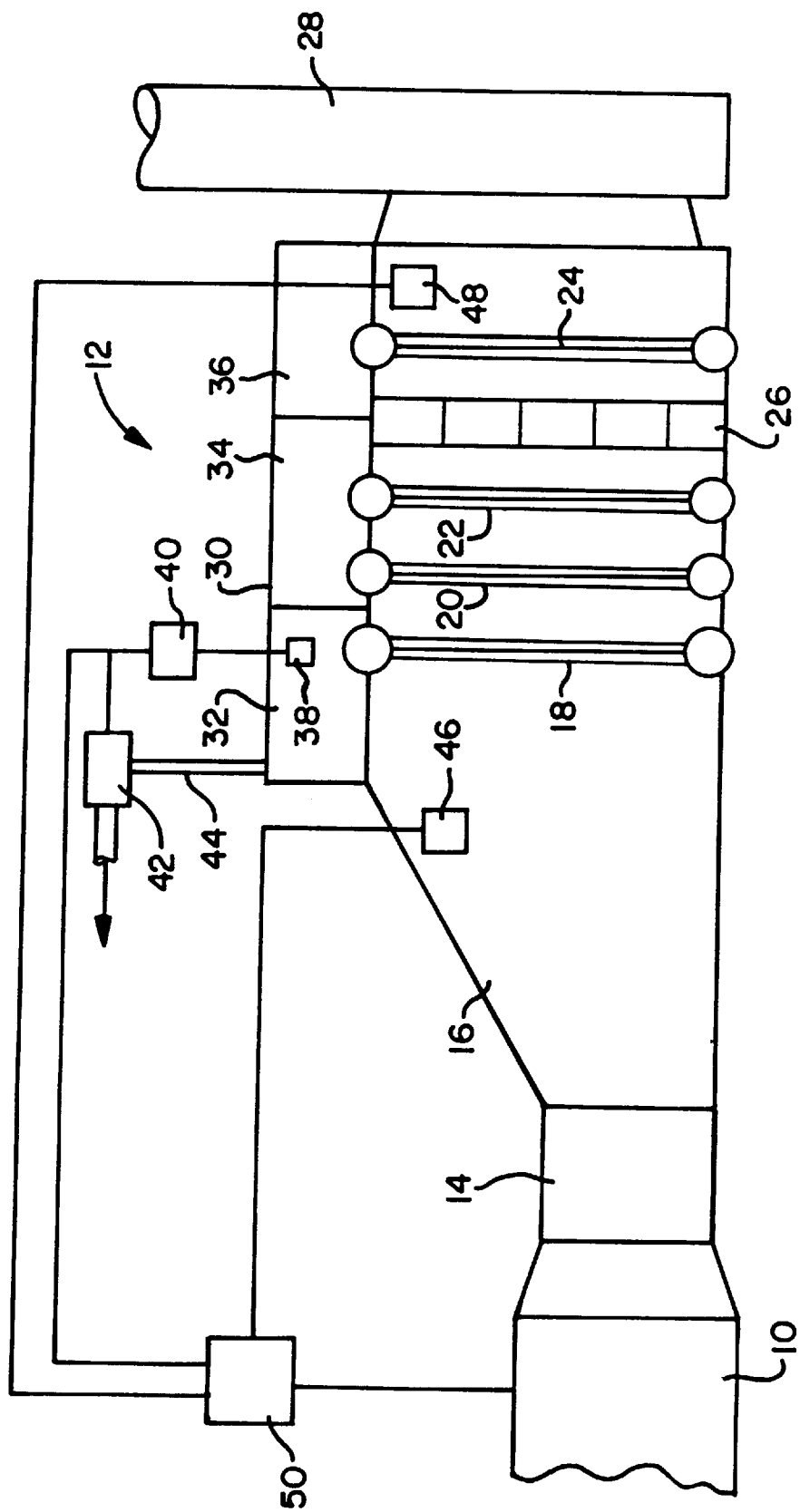
FIG. 2 is a diagrammatic representation of the cross-section of a conventional heat recovery steam generator system showing the upper enclosed cavities and illustrating the detectors, the purge system and the purge controls.

Located on the top of the heat transfer section of the heat recovery steam generator 12 is an enclosed cavity or series of cavities 30 as shown in FIGS. 1 and 2. These cavities are for the purpose of containing headers and links between headers. Similar cavities may be located along the sides of vertical gas flow heat recovery steam generators. The cavity section 30 may be divided into a plurality of cavity compartments such as the three compartments 32, 34 and 36 in FIG. 2.

As indicated, during a shutdown of the system, there is a risk of the leakage of natural gas from the gas turbine into the heat recovery steam generator. Although the enclosed cavity sections are basically sealed from the heat transfer section, this is never a tight seal. Therefore, gases can leak from the heat transfer section into the enclosed cavity sections. This leakage is normally slow but would permit the gas to build up over a period of time. Also, the gas, which can be lighter than air, tends to move by diffusion and buoyancy and collect particularly in the overhead cavities, particularly the first cavity 32. Although standard operating procedures include a purge cycle to remove any potential gas buildup after a shutdown and prior to start-up, this purge would not remove a gas buildup in the cavities since the leakage flow rate into the cavities is low. It may not even remove all of the combustible gas from the main heat transfer section if not done properly.

In the first form of the present invention, a combustible gas detector 38 is located in the cavity section 30 and preferably in the first cavity compartment 32 as shown since that is where the gas would be most likely to collect first. Such combustible gas detectors are conventional and commercially available equipment. The detector 38 is connected to the control box 40 which receives the combustible gas signal from the detector. The control box 40 may be equipped to provide a visual or audible alarm, but it is also connected to the aspirator 42. The control box 40 is adapted to activate the aspirator 42 when the combustible gas signal is received from the detector 38. The aspirator 42 is connected by the vent line 44 to the cavity section 30 and preferably to the first cavity compartment 32 for the reason previously explained. The aspirator 42 may be a vacuum pump or any other suitable device for drawing the gases out of the cavity.

The other form of the invention has a gas detector 46 located in the inlet transition duct 16 and a gas detector 48 located in the main heat transfer section. Although only two such detectors have been illustrated, there could be as many as desired or necessary. These detectors 46 and 48 are connected to the gas turbine control system 50 which, among other functions, controls the start-up of gas flow and ignition. The control system logic is designed to initially permit rotation of the gas turbine without fuel feed so that air flows through and purges the system. The control system logic also prevents fuel feed to the gas turbine and ignition if the control system is receiving combustible gas signals from any one of the detectors 38, 46 and 48. Only when the purge from the gas turbine air flow and the purge by the aspirator 42 have reduced the combustible gas levels to acceptable levels as indicated by the signals from the detectors is fuel feed and ignition initiated by the control system 50. The control system 50 may also be equipped to provide visual and audio alarms.

I claim:

1. A method of operating a gas turbine combined cycle system including a heat recovery steam generator having a heat transfer section and an enclosed cavity section adjacent said heat transfer section wherein gases may leak from said heat transfer section into said enclosed cavity section comprising the steps of:

a) purging said heat transfer section when said gas turbine combined cycle system is shut down;

b) detecting the presence of combustible gases in said cavity section leaking from said heat transfer section during said shutdown and producing a combustible gas presence signal; and c) aspirating said combustible gas from said cavity section in response to said combustible gas presence signal.

2. A method of starting up a gas turbine combined cycle system including a heat recovery steam generator having a heat transfer section and an enclosed cavity section adjacent said heat transfer section wherein combustible gases may accumulate in said heat transfer section and said enclosed cavity section during gas turbine shut-down comprising the steps of:

a. initiating gas turbine rotation without fuel feed to said gas turbine whereby air flows through and purges said heat transfer section of said heat recovery steam generator;

b. detecting the presence of combustible gases in said enclosed cavity section and producing a first combustible gas signal;

c. aspirating said combustible gases from said enclosed cavity section in response to said first combustible gas signal;

d. detecting the presence of combustible gases in said heat transfer section and producing a second combustible gas signal;

e. continuing said gas turbine rotation and purge until termination of said first and second combustible gas signals; and f. initiating fuel flow to said gas turbine and ignition.

3. A method of starting up a gas turbine combined cycle system including a heat recovery steam generator having a heat transfer section wherein combustible gases may accumulate in said heat transfer section during gas turbine shut-down comprising the steps of:

a. initiating gas turbine rotation without fuel feed to said gas turbine whereby air flows through and purges said heat transfer section of said heat recovery steam generator;

b. detecting the presence of combustible gases in said heat transfer section and producing a combustible gas signal;

c. continuing said gas turbine rotation and purge until termination of said combustible gas signal; and d. initiating fuel flow to said gas turbine and ignition.

\* \* \* \* \*